(12) United States Patent
Ba-Abbad et al.

(10) Patent No.: US 8,709,257 B2
(45) Date of Patent: Apr. 29, 2014

(54) METHOD AND SYSTEM FOR PURIFYING LIQUID USING WASTE HEAT

(75) Inventors: Mazen Abdullah Ba-Abbad, Riyadh (SA); Hany Abdulrahman Al-Ansary, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 505 days.

(21) Appl. No.: 12/763,784

(22) Filed: Apr. 20, 2010

(65) Prior Publication Data

US 2011/0253522 A1   Oct. 20, 2011

(51) Int. Cl.
| | | |
|---|---|---|
| C02F 9/10 | (2006.01) | |
| C02F 1/52 | (2006.01) | |
| C02F 5/00 | (2006.01) | |
| C02F 1/14 | (2006.01) | |
| C02F 1/16 | (2006.01) | |
| B01D 3/04 | (2006.01) | |

(52) U.S. Cl.
USPC ........... 210/696; 210/737; 210/774; 210/806; 210/181; 210/182; 210/195.1; 210/532.1; 210/521; 203/10; 203/7; 203/40; 203/47; 203/25

(58) Field of Classification Search
None
See application file for complete search history.

(56) References Cited

U.S. PATENT DOCUMENTS

| | | | | |
|---|---|---|---|---|
| 1,516,314 | A * | 11/1924 | Sebald | 202/163 |
| 1,831,433 | A * | 11/1931 | Zoul | 210/777 |
| 2,836,045 | A * | 5/1958 | Smith | 68/18 R |
| 3,248,181 | A * | 4/1966 | Shinkichi | 23/300 |
| 3,476,654 | A * | 11/1969 | Sieder | 203/7 |
| 3,975,241 | A * | 8/1976 | Smith | 202/202 |
| 4,097,378 | A * | 6/1978 | St. Clair | 210/770 |
| 4,595,459 | A * | 6/1986 | Kusakawa et al. | 202/177 |
| 4,643,832 | A * | 2/1987 | Iniotakis et al. | 210/712 |
| 6,054,050 | A * | 4/2000 | Dyke | 210/639 |
| 6,536,523 | B1 * | 3/2003 | Kresnyak et al. | 166/266 |
| 6,699,369 | B1 * | 3/2004 | Hartman et al. | 203/11 |
| 7,357,849 | B2 * | 4/2008 | Wright | 203/10 |
| 2005/0145568 | A1 * | 7/2005 | Mc Ginnis | 210/639 |
| 2006/0237366 | A1 * | 10/2006 | Al-Mayahi | 210/644 |
| 2008/0223791 | A1 * | 9/2008 | Mizuno et al. | 210/701 |

* cited by examiner

*Primary Examiner* — David C Mellon
(74) *Attorney, Agent, or Firm* — Timberline Patent Law Group PLLC

(57) ABSTRACT

A method and system for purifying liquid using waste heat is provided. Initially, a liquid is mixed with an anti-sealant agent in a first filtering unit to form a liquid mixture. Thereafter, the liquid mixture is filtered in the first filtering unit to separate foreign objects from the liquid mixture. Subsequently, the liquid mixture is heated in a pipe arrangement connecting the first filtering unit and one or more second filtering units to generate steam. The steam obtained from the heated liquid mixture is then purified in the one or more second filtering units. Thereafter, the purified steam is condensed in the pipe arrangement to obtain the purified liquid.

4 Claims, 5 Drawing Sheets though thermal methods typically produce liquid of high purity these methods require large amount of energy. In particular, such systems require mechanical energy to pump the contaminated liquid into the system or to maintain certain pressure gradients within the system. The mechanical energy required is generally more expensive than thermal energy. Moreover, these systems have a complex configuration and, thus, have very high initial costs of construction and initial operation. Therefore, the use is more limited to large scale municipal installations. As in mechanical methods, thermal systems also produce a large amount of drain liquid including the concentrated foreign objects, such as high salinity water. These concentrated foreign objects are often rejected to the environment and, therefore, may be detrimental to the environment.

METHOD AND SYSTEM FOR PURIFYING LIQUID USING WASTE HEAT

FIELD OF THE INVENTION

The present invention generally relates to liquid purification and more specifically, to method and system for purifying sewage water, or waste water or saline water using waste heat.

BACKGROUND OF THE INVENTION

High volume purification of contaminated liquids, such as sewage water, waste water or saline water, is a major technical and economical challenge. This challenge becomes important due to the current shortage of fresh water supplies for consumption or agriculture. Several conventional methods have been proposed for providing purified liquids, such as mechanical methods or thermal methods. The mechanical methods, such as reverse osmosis, require the use of membranes or filters to separate a liquid from its foreign objects. The foreign objects are concentrated in a drain liquid that needs to be further treated or that is rejected to the environment. This rejection of foreign objects to the environment harms the environment.

In thermal methods, such as a multi-stage flash evaporation, a multi-effect distillation and a mechanical vapor compression, the contaminated liquid is heated and re-condensed while its foreign objects are separated during the phase transitions of the liquid. Even though thermal methods typically produce liquid of high purity these methods require large amount of energy. In particular, such systems require mechanical energy to pump the contaminated liquid into the system or to maintain certain pressure gradients within the system. The mechanical energy required is generally more expensive than thermal energy. Moreover, these systems have a complex configuration and, thus, have very high initial costs of construction and initial operation. Therefore, the use is more limited to large scale municipal installations. As in mechanical methods, thermal systems also produce a large amount of drain liquid including the concentrated foreign objects, such as high salinity water. These concentrated foreign objects are often rejected to the environment and, therefore, may be detrimental to the environment.

Therefore, there is a need for a liquid purification method and system, that have manageable initial costs, enable an energy efficient operation, and that are safe for the environment.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
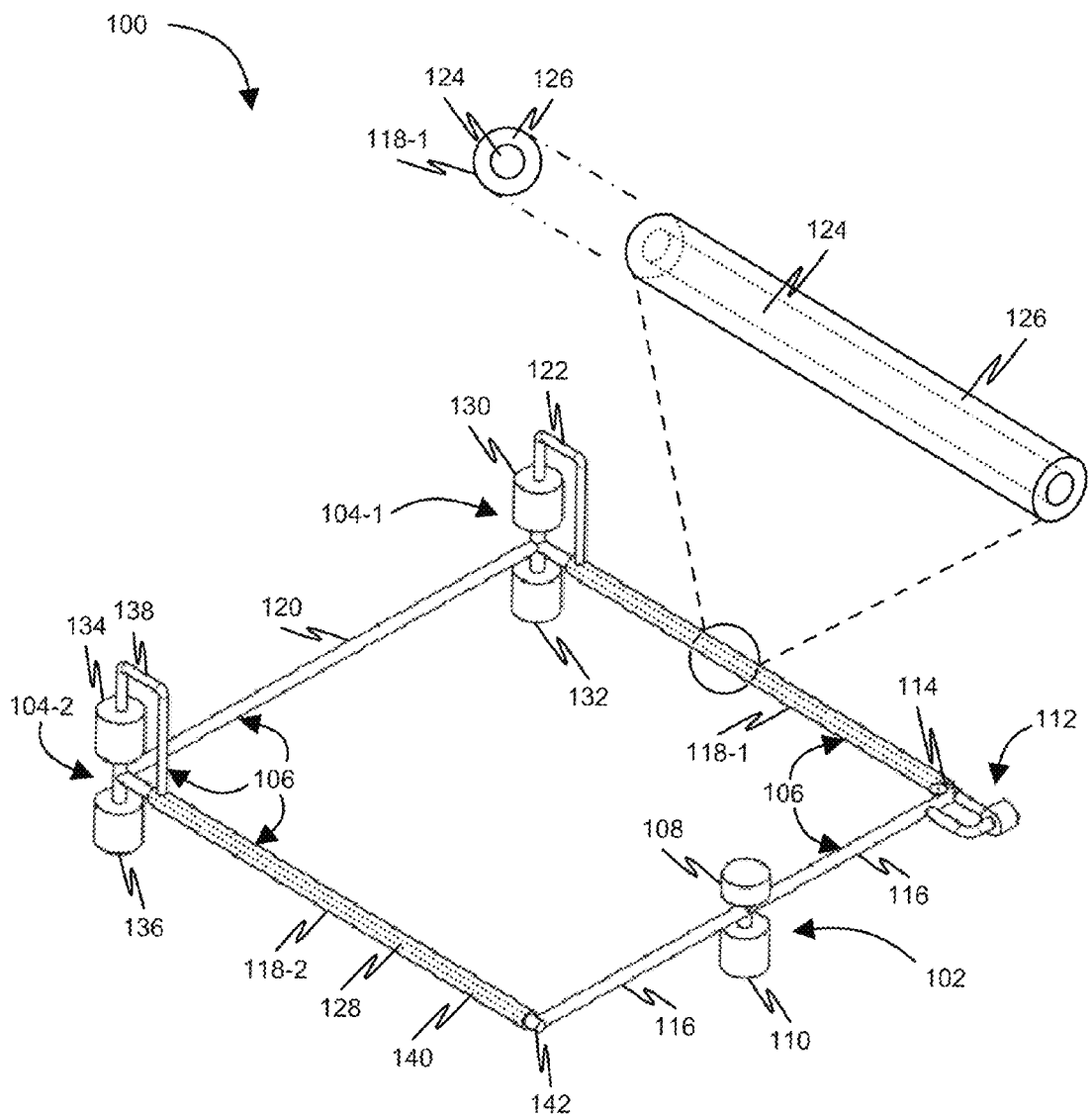
FIG. 1 illustrates a block diagram of a liquid purification system for purifying a liquid using waste heat in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to method and system for purifying liquid using waste heat. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and system for purifying a liquid using waste heat. The method includes mixing the liquid with an anti-scalant agent in a first filtering unit of a liquid purification system to form a liquid mixture. Thereafter, the liquid mixture is filtered in the first filtering unit to separate foreign objects from the liquid mixture. The liquid mixture is subsequently heated in a pipe arrangement to get a heated liquid mixture along with steam. The steam is generated because the boiling temperature of the liquid is less than the boiling temperature of the anti-scalant agent. Thereafter, the heated liquid mixture is supplied along with the steam to one or more second filtering units. The steam generated from the heated liquid mixture is then purified in the one or more second filtering units for separating foreign objects from the steam. The foreign objects collected in the first filtering unit and the one or more second filtering units are processed for extracting solid foreign objects that may be used as fertilizers or for other applications. In addition, the purified steam obtained from the one or more second filtering units is condensed in the pipe arrangement for obtaining a purified liquid.

Referring to the figures, FIG. 1 illustrates a block diagram of a liquid purification system 100 for purifying liquid using waste heat in accordance with an embodiment of the invention. As shown in FIG. 1, liquid purification system 100 includes a first filtering unit 102, one or more second filtering units such as, a second filtering unit 104-1 and a second filtering unit 104-2 and a pipe arrangement 106. In an embodiment, liquid purification system 100 may be tilted thereby positioning second filtering unit 104-1 and second filtering unit 104-2 at a higher level than first filtering unit 102.

First filtering unit 102 includes an inlet container 108 and a waste container 110. Inlet container 108 is capable of receiving the liquid and an anti-scalant agent. The liquid may include, but not limited to, a sewage water, a waste water and a saline water. Examples of the anti-scalant agent may include, but not limited to, an ionic liquid, a nitrate, glycerin, ethylene glycol and a salt. The ionic liquid may include ions, preferably ionic salts. The ionic salts may include, but not limited to, N-butyl-N-methylpyrrolidinium-bis(trifluoromethanesulfonyl)-imide, and 1-butyl-3-methyl-imidazolium-tetraflouroborate. Prior to receiving the liquid and the anti-scalant agent, filtering unit 102 may be cleaned. In an embodiment, a pump 112 is configured for cleaning first filtering unit 102. Pump 112 cleans inlet container 108 and waste container 110 of first filtering unit 102. Thereafter, the liquid and the anti-scalant agent are mixed in inlet container 108 to form a liquid mixture.

Once the liquid mixture is formed, a valve 114 is closed and pump 112 circulates the liquid mixture between first filtering unit 102 and pipe arrangement 106. During circulation of the liquid mixture, the liquid mixture moves back and forth through pipe arrangement 106. Pipe arrangement 106 includes a plurality of pipes connecting first filtering unit 102, one or more second filtering units and pump 112. A pipe of the plurality of pipes is one of a feeding pipe 116, a steam condensing pipe such as, a steam condensing pipe 118-1 and a steam condensing pipe 118-2, a heating pipe 120, and a steam feeding pipe 122. Thus, the liquid mixture is pumped back and forth through feeding pipe 116 that connects first filtering unit 102 and pump 112. This circulation of the liquid mixture results in settling of dissolved and suspended foreign objects in waste container 110 of first filtering unit 102. This is described in detail in conjunction with FIG. 2A.

The foreign objects that are precipitated from the liquid mixture in response to circulation of the liquid mixture are collected from waste container 110 for further processing. The foreign objects may be processed using centrifuging, condensing, boiling and evaporating techniques or any other techniques known in the art for extracting the solid foreign objects. The foreign objects may be processed outside liquid purification system 100. For instance, the foreign objects may be processed to obtain solid foreign objects that are used as fertilizers. These fertilizers produced are enriched soluble fertilizers. However, it will be apparent to the person skilled in the art that the foreign objects may be processed to obtain the foreign objects in any other required form. Further, these processed foreign objects may be used in variety of applications other than being used as a fertilizer. This method of processing the foreign objects to obtain the solid foreign objects is explained in detail in conjunction with FIG. 2A and FIG. 2B.

By separating the foreign objects from the liquid mixture, the liquid mixture is filtered. Thus, a first stage of filtration of the liquid mixture is achieved at first filtering unit 102 of liquid purification system 100. The filtered liquid mixture is stored in inlet container 108 for further processing. However, it will be apparent to the person skilled in the art that the liquid mixture, primarily filtered by first filtering unit 102, may be stored in any similar container outside liquid purification system 100 for further processing.

The filtered liquid mixture is then supplied to secondary filtering unit 104-1 for further processing through valve 114. The filtered liquid mixture is supplied to secondary filtering unit 104-1 through feeding pipe 116 and steam condensing pipe 118-1 of the plurality pipes. In an embodiment, steam condensing pipe 118-1 is a coaxial pipe as shown in FIG. 1. Steam condensing pipe 118-1 includes an inner pipe 124 and an outer pipe 126 Inner pipe 124 of steam condensing pipe 118-1 is connected to first filtering unit 102 through feeding pipe 116. Further, outer pipe 126 of steam condensing pipe 118-1 is connected to second filtering unit 104-1. However, it will apparent to a person skilled in the art that steam condensing pipe 118-1 may have any other different structural configuration and may be capable of receiving the liquid mixture from feeding pipe 116.

Inner pipe 124 of steam condensing pipe 118-1 initially receives the liquid mixture from feeding pipe 116. The liquid mixture is then supplied to heating pipe 120 of pipe arrangement 106 from steam condensing pipe 118-1. As shown in FIG. 1, heating pipe 120 is connected to second filtering unit 104-1 and second filtering unit 104-2. Heating pipe 120 is connected to inner pipe 124 of steam condensing pipe 118-1 through second filtering unit 104-1. Further, heating pipe is connected to an inner pipe 128 of steam condensing pipe 118-2 through second filtering unit 104-2. Thus, heating pipe 120 receives the liquid mixture from inner pipe 124 of steam condensing pipe 118-1. The liquid mixture received is then heated in heating pipe 120. The liquid mixture is heated using one or more heat sources (not shown in FIG. 1). The boiling temperature of the liquid is less than the boiling temperature of the anti-scalant agent, thereby generating steam along with the heated liquid mixture. The one or more heat sources may include, but not limited to, a photovoltaic unit, a solar unit, a hot exhaust gas unit, a flame and a hot liquid.

For example, heating pipe 120 may be connected to a solar unit to receive heat energy in the form of solar energy. This heat energy received may be used for heating the liquid mixture present within heating pipe 120. Subsequent to heating the liquid mixture, heating pipe 120 supplies the heated liquid mixture to second filtering unit 104-1. Alternatively, heating pipe 120 may supply the heated liquid mixture along with steam generated from the heated liquid mixture to second filtering unit 104-2.

Second filtering unit 104-1 includes a steam container 130 and a waste container 132. Steam container 130 receives the heated liquid mixture along with the steam from heating pipe 120. The steam generated from the heated liquid mixture is collected in steam container 130. Subsequent to collecting the steam, any foreign objects present in the steam are also separated in steam container 130. The foreign objects separated from the steam are collected in waste container 132 of second filtering unit 104-1 for further processing. The process of separating the foreign objects from the steam and subsequently collecting the foreign objects for further processing is explained in detail in conjunction with FIG. 2B. Once the foreign objects are separated, purified steam is obtained in second filtering unit 104-1. This process of purification in second filtering unit 104-1 may be considered as a second stage filtration of the liquid in liquid purification system 100 as the first stage of filtration is performed in first filtering unit 102.

The purified steam thus obtained is then fed into steam condensing pipe 118-1 using steam feeding pipe 122. Steam feeding pipe 122 is connected to steam container 130 of second filtering unit 104-1 and outer pipe 126 of steam condensing pipe 118-1. Thus, the purified steam present in steam container 130 is initially supplied to steam feeding pipe 122. Thereafter, steam feeding pipe 122 supplies the purified steam to outer pipe 126 of steam condensing pipe 118-1. The purified steam received within outer pipe 126 is used for heating the liquid mixture received in inner pipe 124 of steam condensing pipe 118-1 from first filtering unit 102. This process of heating the liquid mixture involves transfer of heat from the purified steam in outer pipe 126 to the liquid mixture in inner pipe 124 thereby condensing the purified steam in outer pipe 126 to obtain the purified liquid. Steam condensing pipe 118-1 is insulated from outside to minimize heat losses from outer pipe 126 and inner pipe 124. The purified liquid is then supplied through an outlet of liquid purification system 100. In an embodiment, the outlet (not shown in FIG. 1) may be configured in outer pipe 126 of steam condensing pipe 118-1. The purified liquid supplied is obtained after two stages of filtration of the liquid mixture performed in first filtering unit 102 and second filtering unit 104-1 of liquid purification system 100 as mentioned earlier. Further, the pre-heated liquid mixture present in inner pipe 124 is supplied to heating pipe 120. The pre-heated liquid mixture is heated in heating pipe 120 to generate the steam. This generated steam is then fed into second filtering unit 104-1 for filtration thereby completing a cyclic process of generating purified liquid from the liquid mixture.

In an embodiment, the liquid mixture may also be purified using heating pipe 120, second filtering unit 104-2 and steam condensing pipe 118-2 to obtain the purified liquid. To this end, initially, the liquid mixture is supplied to steam condensing pipe 118-2 using feeding pipe 116 connected to first filtering unit 102. The liquid mixture supplied is then fed into heating pipe 120 for heating the liquid mixture using the one or more heat sources. The process of heating the liquid mixture in heating pipe 120 is explained in detail above. The steam generated in response to heating the liquid mixture is fed into second filtering unit 104-2. The steam present is then purified within second filtering unit 104-2 to separate the foreign objects from the steam. This process of separating the foreign objects is explained above in conjunction with second filtering unit 104-1.

The purified steam thus obtained is fed into steam condensing pipe 118-2 using steam feeding pipe 138 from second filtering unit 104-2. Steam feeding pipe 138 is connected to steam container 134 of second filtering unit 104-2 and outer pipe 140 of steam condensing pipe 118-2. Thus, the purified steam present in steam container 134 is initially supplied to steam feeding pipe 138. Thereafter, steam feeding pipe 138 feeds the purified steam into outer pipe 140 of steam condensing pipe 118-2. The purified steam received within outer pipe 140 is used for heating the liquid mixture received in inner pipe 128 of steam condensing pipe 118-2 from first filtering unit 102. This process of heating the liquid mixture involves transfer of heat from the purified steam in outer pipe 140 to the liquid mixture in inner pipe 128 thereby condensing the purified steam in outer pipe 140 to obtain the purified liquid. Steam condensing pipe 118-2 is insulated from outside to minimize heat losses from outer pipe 140 and inner pipe 128. Further, the pre-heated liquid mixture present in inner pipe 128 is supplied to heating pipe 120. The pre-heated liquid mixture is heated in heating pipe 120 as described earlier. The purified liquid is supplied through an outlet of liquid purification system 100. In an embodiment, the purified liquid may be supplied through outlet 142 configured in outer pipe 140 of steam condensing pipe 118-2.

The process of purifying the liquid mixture may occur simultaneously in second filtering unit 104-1 and second filtering unit 104-2, thereby enabling liquid purification system 100 to produce more purified liquid. It will be apparent to a person skilled in the art that liquid purification system 100 may include more second filtering units similar to second filtering unit 104-1 and second filtering unit 104-2 and first filtering units similar to first filtering unit 102 for filtering the liquid mixture thereby enabling liquid purification system 100 to supply more purified liquid.

Figure 2A:
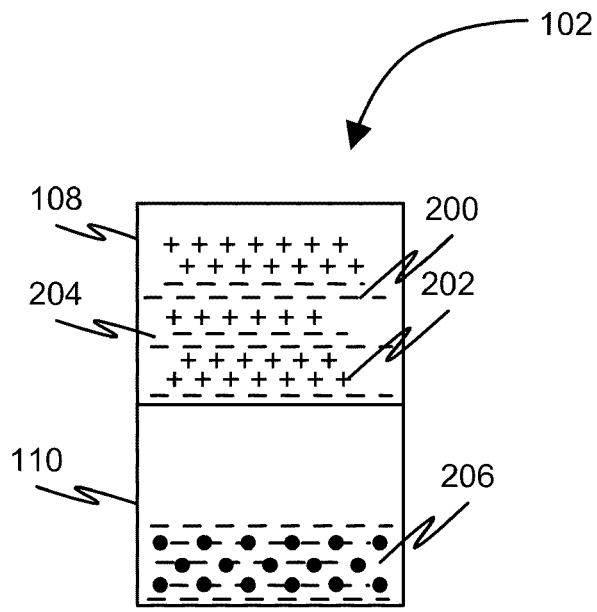
FIG. 2A and FIG. 2B illustrate block diagrams of a first filtering unit and one or more second filtering units of a liquid purification system in accordance with an embodiment of the invention.
Figure 2B:
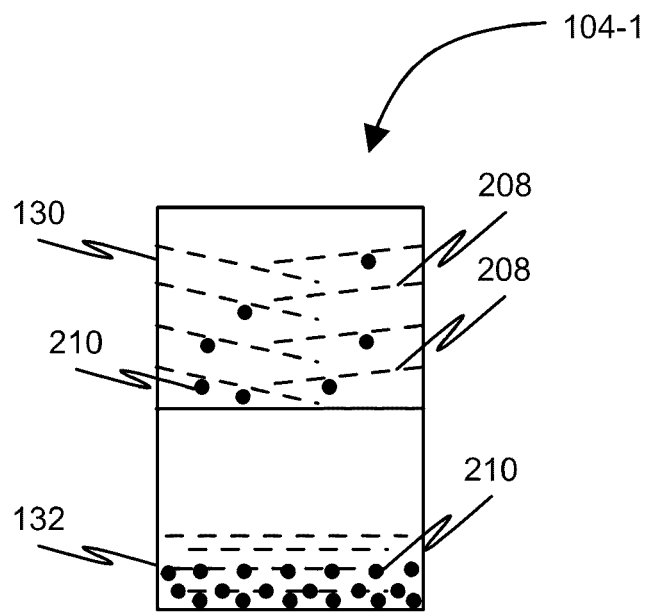

FIG. 2A and FIG. 2B illustrate a block diagram of first filtering unit 102 and a second filtering unit such as, second filtering unit 104-1, of the one or more second filtering units in accordance with an embodiment of the invention. As shown in FIG. 2A, inlet container 108 is capable of receiving a liquid 200 and an anti-scalant agent 202. Examples of liquid 200 and anti-scalant agent 202 are described in detail in conjunction with FIG. 1. Thereafter, liquid 200 and anti-scalant agent 202 are mixed in inlet container 108 to form liquid mixture 204. Subsequently, liquid mixture 204 is circulated back and forth using pump 112 (not shown in FIG. 2A). The process of circulation of the liquid mixture is described in detail in conjunction with FIG. 1. This circulation of liquid mixture 204 results in settling of foreign objects 206, that are dissolved and suspended in liquid mixture 204, in waste container 110. Thereafter, foreign objects 206 are processed for extracting solid foreign objects that are used as fertilizers or for other applications. In addition, this extraction of solid foreign objects helps in reclaiming valuable salts and other substances used during the filtration process.

In an embodiment, foreign objects 206 may be processed in any container outside liquid purification system 100 to obtain solid foreign objects. Foreign objects 206 may be processed using filtering, centrifuging, condensing, boiling and evaporating techniques or any other techniques known in the art for extracting the solid foreign objects. For example, anti-scalant agent 202 such as, glycerin may be processed or recycled by boiling and condensing the glycerin thereby leaving dry solid salt. In another example, the anti-scalant agent 202 such as an ionic liquid may be processed by dissolving the ionic liquid in an organic solvent for example, kerosene, ether or acetone thereby leaving behind salts. The salts are left behind because salts do not dissolve in the organic solvent. Thereafter, the organic solvent is boiled and condensed. Subsequently, the ionic liquid is recycled and supplied to liquid purification system 100 through an inlet (not shown in FIG. 2A) of filtering unit 102.

After the first stage of filtration of liquid mixture 204 in first filtering unit 102, liquid mixture 204 is supplied to second filtering unit 104-1 for further processing after heating liquid mixture 204 in pipe arrangement 106 (not shown in FIG. 2B). The process of heating and supplying liquid mixture 204 along with steam using pipe arrangement 106 to second filtering unit 104-1 is described in detail in conjunction with FIG. 1. As depicted in FIG. 2B, second filtering unit 104-1 includes steam container 130 and waste container 132. Steam container 130 includes one or more louvers 208. One or more louvers 208 are configured at an upper portion of steam container 130. In addition, one or more louvers 208 are arranged parallel to each other on both sides of steam container 130. Further, each louver of one or more louvers 208 is configured in a slightly tilted manner within steam container 130 thereby forming a zigzag path.

When steam container 130 receives heated liquid mixture 204 along with the steam from pipe arrangement 106, the steam is collected in steam container 130. The steam then flows through one or more louvers 208 to follow the zigzag-path. This results in retarding and trapping of foreign objects 210 present in the steam at one or more louvers 208. As shown in FIG. 2B, trapped foreign objects 210 may fall into the bottom of waste container 132. Thereafter, foreign objects 210 are further processed for extracting solid foreign objects that are used as fertilizers or for other applications. In an embodiment, foreign objects 210 fall into the bottom of waste container 132 along with some amount of liquid mixture 204. In this case, foreign objects 210 along with liquid mixture 204 are further processed for extracting solid foreign objects. The process of extracting the solid foreign objects by processing foreign objects 210 is described in detail above.

In an embodiment, liquid purification system 100 may be tilted thereby positioning second filtering unit 104-1 and second filtering unit 104-2 at a higher level than first filtering unit 102 as mentioned earlier. This positioning of steam container 130 and steam container 134 (not shown in FIG. 2B) allows the steam and the dissolved foreign objects in the form of gases to bubble upwards and move through steam container 130 and steam container 134 smoothly thereby facilitating in enhanced collection of the steam in steam container 130 and steam container 134. Moreover, this further facilitates in pressurized flow of the collected steam in steam feeding pipe 122 and steam feeding pipe 138.

In another embodiment, the purified steam obtained from steam feeding pipe 122 during the second filtering stage performed in second filtering unit 104-1 may be directly supplied to second filtering unit 104-2 for further purification. In such a case, steam feeding pipe 122 may be connected to second filtering unit 104-2 through an alternate pipe (not shown in FIG. 2B) of pipe arrangement 106. During such operation, heating pipe 120 may be closed by any known means for preventing liquid mixture 204 and the steam from entering second filtering unit 104-2. In addition, feeding pipe 116 may be closed by any known means to prevent flow of liquid mixture 204 from feeding pipe 116 to steam condensing pipe 118-2. The purification process carried by second filtering liquid 104-2 is explained earlier. It will be apparent to the person skilled in the art that an alternate arrangement of one or more louvers may be used in steam container 130 of second filtering unit 104-2 for trapping and retarding foreign objects, if any, in waste container 132 for providing further purified steam. Thereafter, the purified liquid may be obtained from outlet 142 configured in outer pipe 140 of steam condensing pipe 118-2. This process of filtration performed by second filtering unit 104-2 may be considered as a third stage of filtration.

Figure 3:
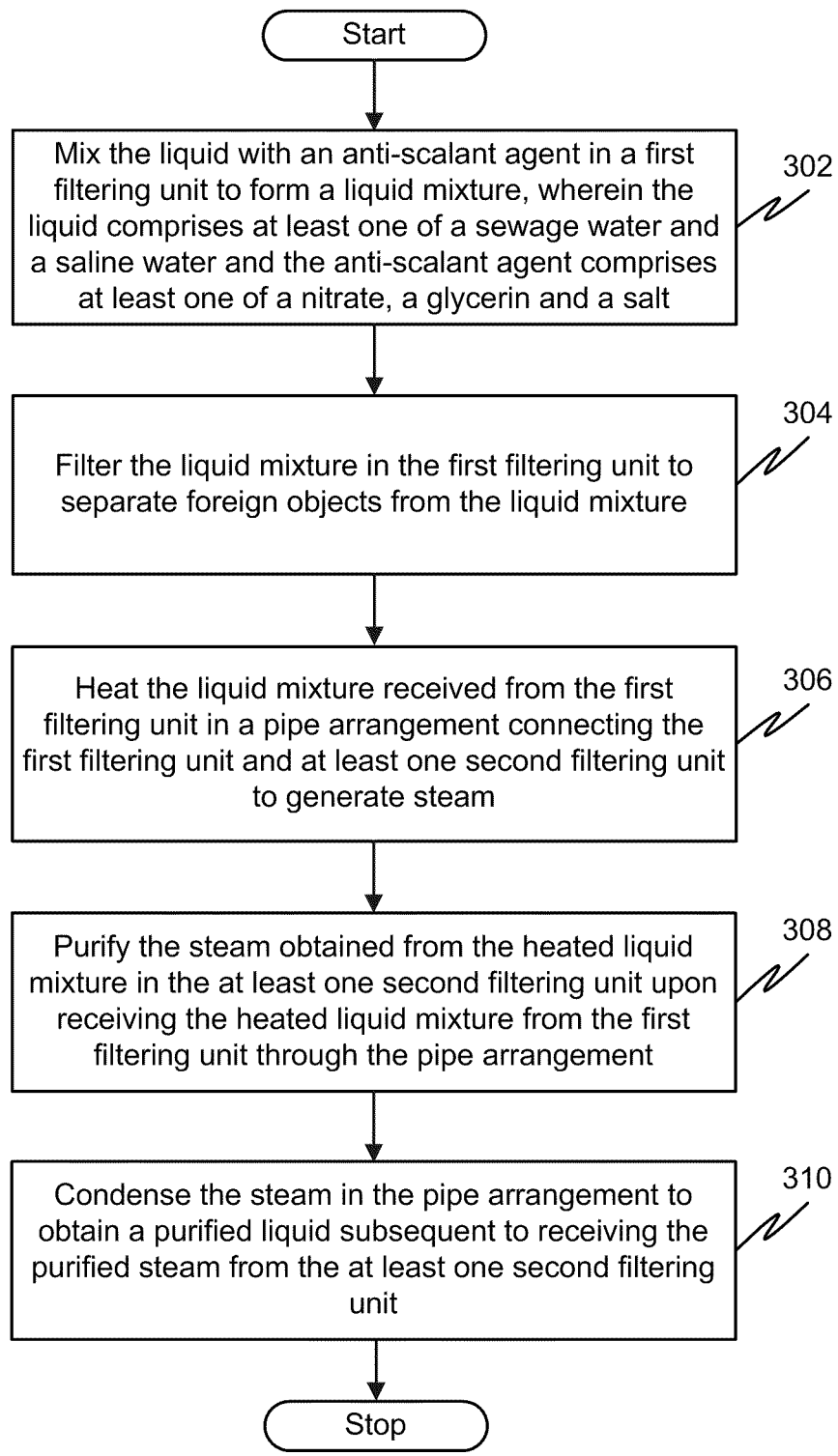
FIG. 3 illustrates a flow diagram of a method for purifying a liquid in accordance with an embodiment of the invention.

FIG. 3 illustrates a flow diagram of a method for purifying a liquid in accordance with an embodiment of the invention. The liquid is purified in a liquid purification system. The liquid purification system includes a first filtering unit and one or more second filtering units for filtering the liquid. The first filtering unit and one or more second filtering units enables multiple stage filtering wherein each filtering stage provides filtered liquid. The first filtering unit and the one or more second filtering units are connected through a pipe arrangement. The first filtering unit performs the first stage of filtration of the liquid mixture before supplying a liquid mixture to the one or more second filtering units. The liquid mixture is heated in the pipe arrangement prior to supplying the liquid mixture to the one or more second filtering units. A second filtering unit of the one or more second filtering units then purifies the steam generated from the heated liquid mixture and supplies the purified steam. The purified steam is condensed to obtain the purified liquid in an outlet of the pipe arrangement.

At step 302, the liquid is mixed with an anti-scalant agent in an inlet container of a first filtering unit to form a liquid mixture. For example, liquid 200 is mixed with anti-scalant agent 202 in inlet container 108 of first filtering unit 102 for forming liquid mixture 204. Examples of the liquid and the anti-scalant agent that are mixed for forming the liquid mixture are described in detail in conjunction with FIG. 1. Thereafter, the liquid mixture is filtered in the first filtering unit for separating foreign objects from the liquid mixture at step 304. The foreign objects separated from liquid mixture settles in a waste container of the first filtering unit. This process of filtering the liquid mixture in the first filtering unit by separating foreign objects from the liquid mixture is described in detail in conjunction with FIG. 4. In response to filtration of the liquid mixture, the liquid mixture is heated in a pipe arrangement at step 306 for generating steam. The pipe arrangement may use one or more heat sources for heating the liquid mixture. The one or more heat sources are described in detail in conjunction with FIG. 1. The pipe arrangement connects the first filtering unit with a second filtering unit of the one or more second filtering units.

For example, second filtering unit 104-1 of the one or more second filtering units is connected with first filtering unit 102 through feeding pipe 116 and steam condensing pipe 118-1 of pipe arrangement 106. Liquid mixture 204 received from first filtering unit 102 is heated in heating pipe 120. The boiling temperature of liquid 200 is less than the boiling temperature of anti-scalant agent 202, thereby generating steam along with heated liquid mixture 204. Thereafter, heating pipe 120 then supplies heated liquid mixture 204 along with the steam to second filtering unit 104-1 for further filtration.

At step 308, after receiving the heated liquid mixture along with the steam through the pipe arrangement at the second filtering unit of the one or more second filtering units, the steam is purified in the second filtering unit. The steam is purified by removing the foreign objects from the steam within the second filtering unit. The process of purifying the steam in the second filtering unit is described in detail in conjunction with FIG. 5. Thereafter, the purified steam obtained is condensed at step 310 for obtaining a purified liquid. For example, the purified steam collected from steam container 130 is supplied to outer pipe 126 of steam condensing pipe 118-1 through steam feeding pipe 122. The purified steam is then condensed due to transfer of heat from the purified steam in outer pipe 126 to liquid mixture 204 in inner pipe 124 thereby providing the purified liquid in outer pipe 126 of steam condensing pipe 118-1.

Figure 4:
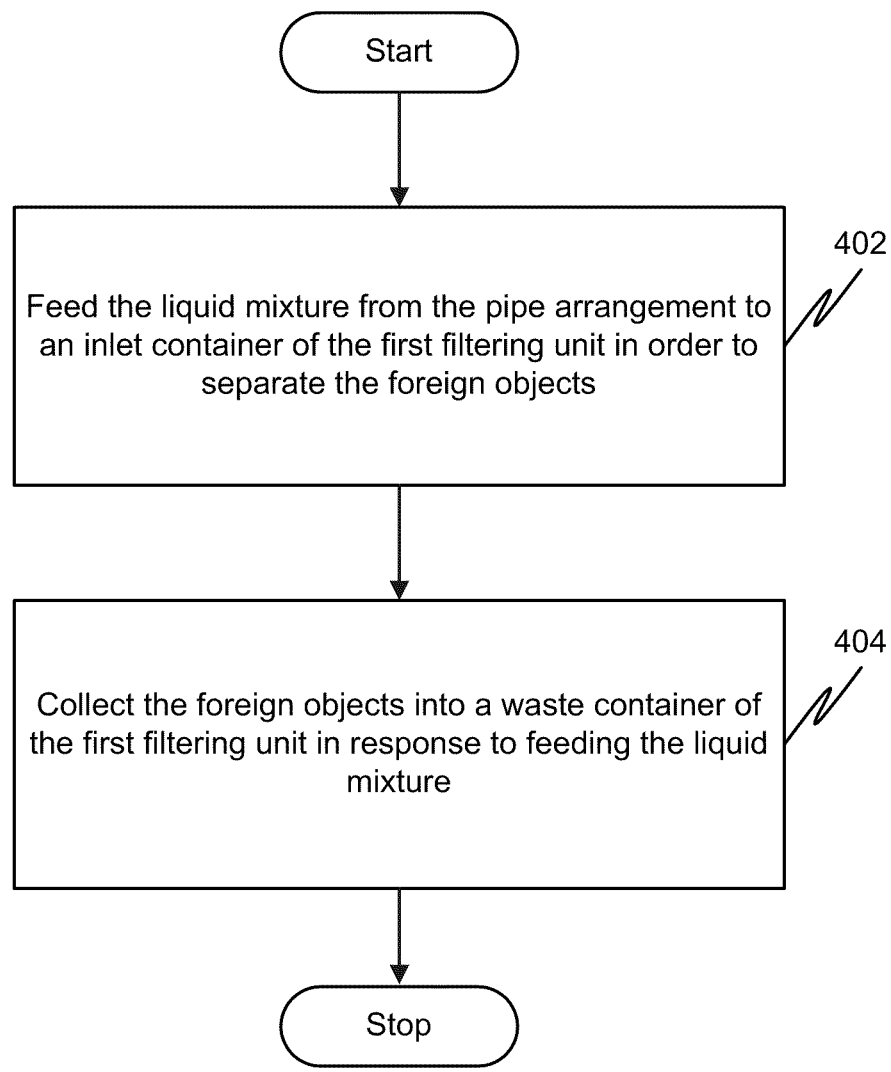
FIG. 4 illustrates a flow diagram of a method for filtering the liquid mixture in a first filtering unit of a liquid purification system in accordance with an embodiment of the invention.

FIG. 4 illustrates a flow diagram of a method for filtering the liquid mixture in a first filtering unit of a liquid purification system in accordance with an embodiment of the invention. At step 402, a liquid mixture is fed from a pipe arrangement to an inlet container of the first filtering unit for separating foreign objects. For example, in response to forming liquid mixture 204 in inlet container 108, valve 114 is closed and pump 112 circulates liquid mixture 204 between first filtering unit 102 and feeding pipe 116 for settling the foreign objects 206 in waste container 110 of first filtering unit 102. Thereafter, at step 404, the foreign objects are collected into a waste container of the first filtering unit for further processing.

The foreign objects are subsequently processed for extracting solid foreign objects that are used as fertilizers. This extraction of solid foreign objects also helps in reclaiming valuable salts and other substances used during the filtration process For example, foreign objects 206 may be processed using filtering, centrifuging, condensing, boiling and evaporating techniques or any other techniques known in the art for extracting the solid foreign objects. For example, anti-scalant agent 202 such as, a glycerin may be processed or recycled by boiling and condensing the glycerin thereby leaving dry solid salt. In another example, the anti-scalant agent such as, an ionic liquid may be processed by dissolving the ionic liquid in an organic solvent for example, kerosene, either or acetone thereby leaving behind salts. These salts are left behind because salts do not dissolve in the organic solvent. Thereafter, the organic solvent is boiled and condensed. Subsequently, the ionic liquid is recycled and supplied to liquid purification system 100 through an inlet of filtering unit 102.

Figure 5:
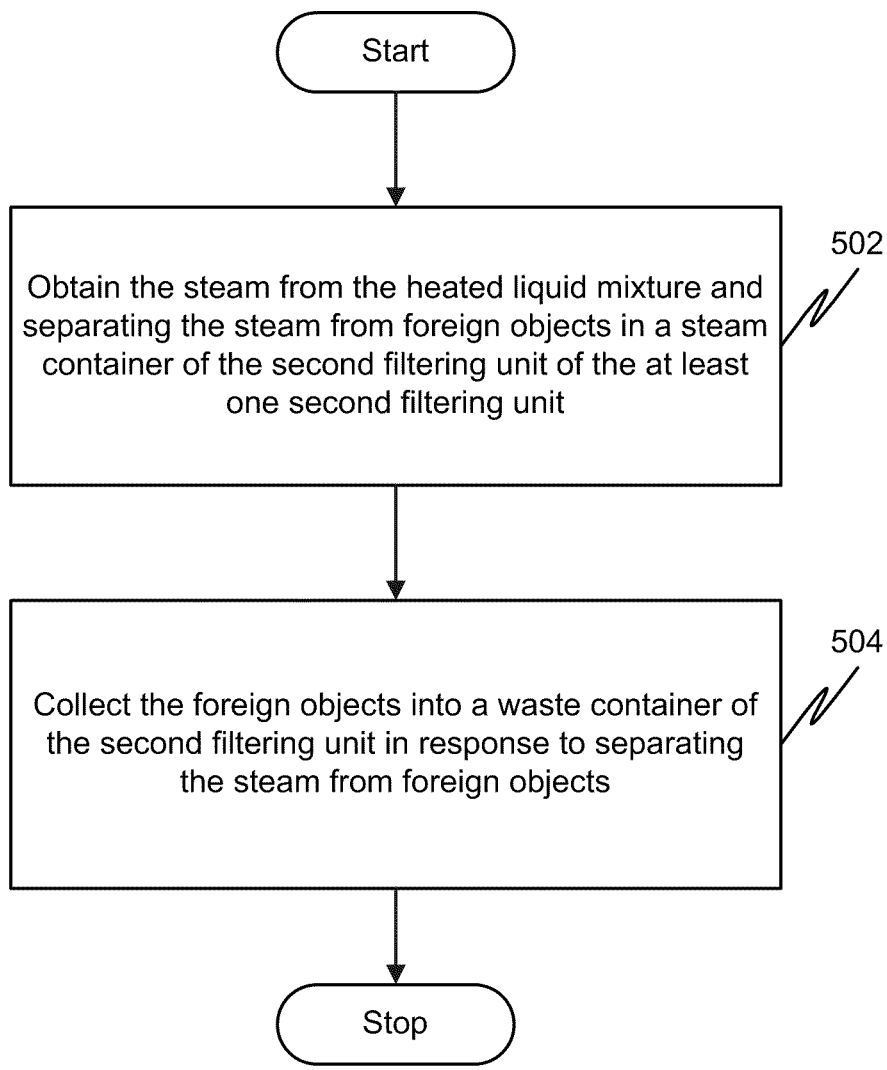
FIG. 5 illustrates a flow diagram of a method for purifying the steam in one or more second filtering unit of a liquid purification system in accordance with an embodiment of the invention.

FIG. 5 illustrates a flow diagram of a method for purifying the steam in a second filtering unit of a liquid purification system in accordance with an embodiment of the invention. At step 502, the steam is obtained from the heated liquid mixture in a steam container of a second filtering unit of the one or more second filtering units. For example, second filtering unit 104-1 receives heated liquid mixture 204 along with the steam from heating pipe 120 for further purification. Thereafter, the steam is obtained from heated liquid mixture 204 in steam container 130 of second filtering unit 104-1 of the one or more second filtering units.

In response to obtaining the steam in the steam container, the steam is separated from foreign objects in the steam container of the second filtering unit. For example, when the steam is collected in steam container 130, the steam then flows through plurality of louvers 208 to follow the zigzag-path. This results in retarding and trapping of foreign objects 210 present in the steam at one or more louvers 208, thereby separating the steam from foreign objects 210. At step 504, the foreign objects separated in the second filtering unit of the at least one second filtering unit are collected into a waste container of the second filtering unit. For example, the foreign objects 210 are collected into waste container 132 of the second filtering unit 104-1. Thereafter, the foreign objects are processed for extracting solid foreign objects that are used as fertilizers. The process of extracting solid foreign objects by processing the foreign objects is described above and in conjunction with FIG. 2A and FIG. 2B.

Various embodiments of the invention provide method and systems for liquid purification using waste heat. The liquid and an anti-scalant agent are mixed to form a liquid mixture. The liquid mixture is subsequently supplied to a first filtering unit and one or more second filtering units using a pipe arrangement for filtration. The first filtering unit and the one or more second filtering units facilitate multiple-stage filtering wherein each filtering stage provides filtered liquid. In addition to facilitating the connection between the first filtering unit and the one or more second filtering units, the pipe arrangement heats the liquid mixture prior to supplying the liquid mixture from the first filtering unit to the one or more second filtering units. This arrangement facilitates in the process of providing more purified liquid at each stage of the multiple-stage filtering process. The method and system as described herein for liquid purification provides high purity liquid using waste heat. In addition, the system does not require any pre-treatment of the liquid that needs to be purified. Moreover, the system does not produce any harmful liquid discharge upon filtering the liquid. In fact, the anti-scalant agents used in the liquid purification system for assisting the filtration process are completely recyclable. Thus, valuable salts and substances used can be reclaimed. In addition, foreign objects extracted from the purified liquid are processed and used as fertilizers.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of purifying waste water, saline water, or sewage water, the method comprising:
    performing a first precipitation of foreign objects from the waste water, saline water, or sewage water by mixing the waste water, saline water, or sewage water with an anti-scalant agent in an inlet container of a filtering unit to form a liquid mixture, wherein the anti-scalant agent comprises one of a nitrate, a glycerin and a salt, and receiving the foreign objects in a waste container connected to the inlet container of the filtering unit as the foreign objects settle;
    heating the liquid mixture received from the inlet container to generate a stream of steam in concentric pipes connecting the inlet container and at least one steam container;
    trapping foreign objects from the stream of steam by directing the stream of steam obtained from the heated liquid mixture through louvers in the at least one steam container, the louvers creating a zig-zag path for the stream of steam to retard movement of the foreign objects and to trap the foreign objects; and
    condensing the steam of steam in an outer pipe of the concentric pipes to obtain purified water while applying a heat energy derived from the condensing to said heating the liquid mixture received from the inlet container.

2. The method of claim 1, wherein obtaining the stream of steam from the heated liquid mixture and separating the foreign objects from the stream of steam in the at least one steam container further comprises collecting the foreign objects into at least one additional waste container connected to the at least one steam container.

3. The method of claim 1, wherein the concentric pipes receive heat from a heat source comprising one of a photovoltaic unit, a solar unit, a hot exhaust gas unit, a flame, and a hot liquid.

4. The method of claim 1, further comprising circulating the liquid mixture back and forth between the inlet container and one or more of the at least one steam containers, while collecting the foreign objects with each cycle of circulation.

* * * * *